United States Patent [19]

Jagt

[11] Patent Number: 5,181,440
[45] Date of Patent: Jan. 26, 1993

[54] TOOL FOR MEASURING THE TRAVEL OF A VEHICLE BRAKE ROD

[76] Inventor: Clarence D. Jagt, 201 Hurricane Hill Dr., Nederland, Colo. 80466

[21] Appl. No.: 815,013

[22] Filed: Dec. 27, 1991

[51] Int. Cl.$^5$ .............................................. B25B 25/00
[52] U.S. Cl. ...................... 81/484; 81/488; 188/1.11; 73/121; 7/100; 7/164
[58] Field of Search ............... 81/488, 484, 485, 9.24, 81/176.1, 176.2, 176.3; 188/1.11; 7/100, 164, 169; 73/121, 132

[56] References Cited

U.S. PATENT DOCUMENTS

| | | |
|---|---|---|
| 4,082,165 | 4/1978 | Harrison . |
| 4,279,214 | 7/1981 | Thorn . |
| 4,550,460 | 11/1985 | Smallbrook et al. . |
| 4,572,040 | 2/1986 | Metz . |
| 4,625,353 | 12/1986 | Tamez et al. . |
| 4,685,164 | 8/1987 | Sebalos . |
| 4,754,857 | 7/1988 | Urban . |
| 4,757,300 | 7/1988 | Sebalos . |
| 4,776,438 | 10/1988 | Schandelmeier . |
| 4,796,731 | 1/1989 | Schmitt . |
| 4,798,265 | 1/1989 | Gibas . |
| 4,855,712 | 8/1989 | Wiley, Jr. et al. . |
| 4,864,900 | 9/1989 | Kreikle et al. . |
| 4,945,818 | 8/1990 | Ware . |
| 4,989,537 | 2/1991 | Hutchinson, Sr. et al. . |
| 4,991,310 | 2/1991 | Melia . |

*Primary Examiner*—Roscoe V. Parker
*Attorney, Agent, or Firm*—Francis A. Sirr; Earl C. Hancock

[57] ABSTRACT

A compound or multi-function tool facilitates manually moving of the brake rod of a motorized land vehicle, and provides a dimensional scale integrally therewith by which the distance of travel of the brake rod between its brake-off and brake-on positions is visually observed and measured.

6 Claims, 3 Drawing Sheets

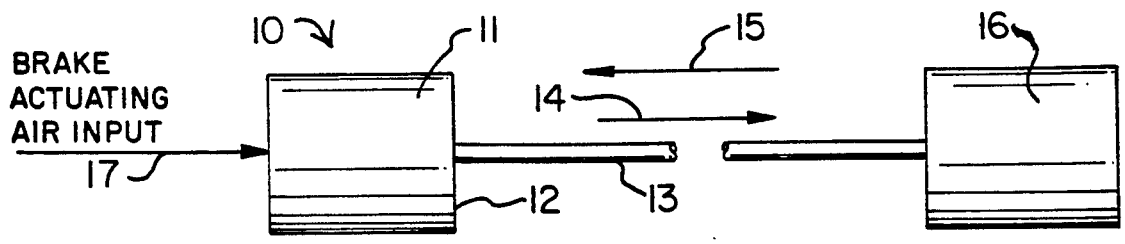
FIG. 1.- PRIOR ART
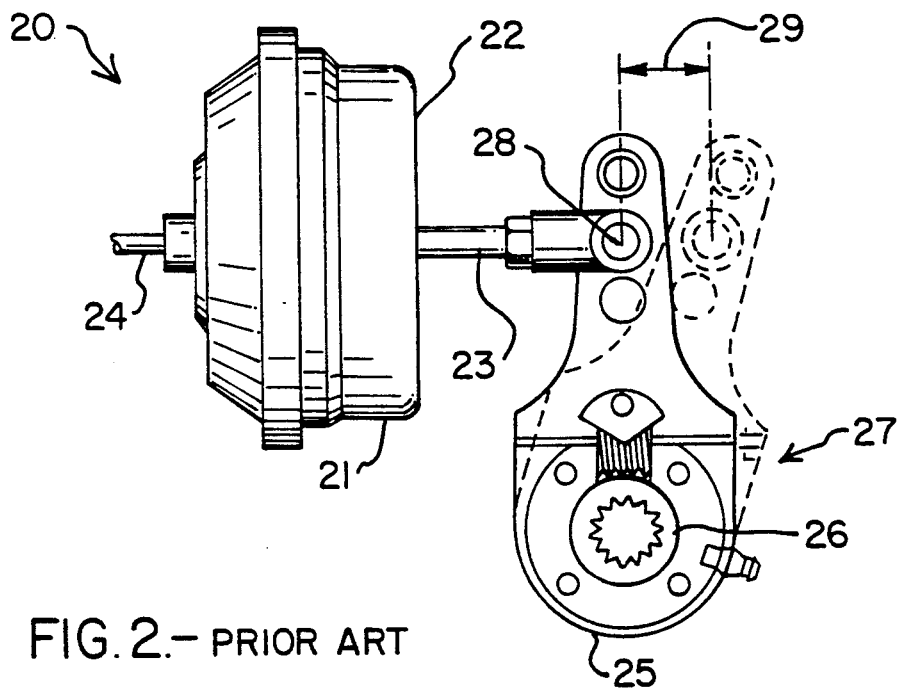
FIG. 2.- PRIOR ART
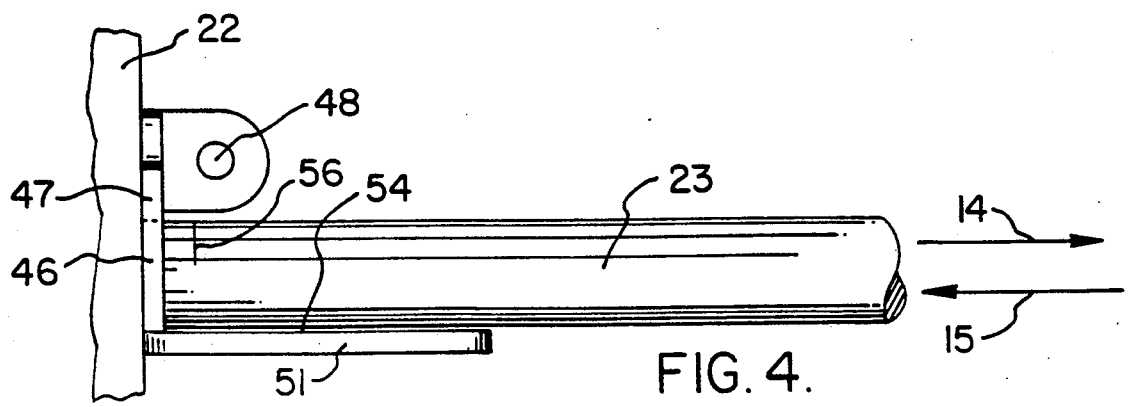
FIG. 4.

TOOL FOR MEASURING THE TRAVEL OF A VEHICLE BRAKE ROD

FIELD OF THE INVENTION

The present invention relates to the field of manually operable compound or multi-function tools, and more specifically to tools for manually activating or moving the brake rod that is associated with the mechanical air brakes of land vehicles such as trucks, school buses and the like, and for providing a dimensional scale by which the distance of travel of the brake rod between its brake-off and brake-on positions can be visually observed and measured.

BACKGROUND OF THE INVENTION

Poorly adjusted vehicle brakes can result in a vehicle out of service condition and can jeopardize human safety. In order to ensure that a vehicle's brakes are properly adjusted, they must be checked at regular time intervals. It is difficult to check the brakes simply by sensing the "feel" of the brake pedal. Under normal braking conditions the brakes may respond in a satisfactory manner, yet under a hard or panic stop the vehicle operator may be unable to stop the vehicle in a desired distance and/or as the vehicle continues to travel in a straight line.

Before checking the brakes, and then making brake adjustments as needed, the vehicle should be parked on a level surface, with the wheels blocked, with the brakes released, and with the engine off.

A standard prior procedure required a mechanic or vehicle operator to manually pull the brake rod to the limit of its brake-on movement, for example by hand or by prying the brake mechanism with a pry bar. The mechanic then measured the distance from the brake assembly's clevis pin to the face of the air chamber, at both the fully retracted and fully extended position of the brake rod. The difference between these measurements is the brake rod's travel or slack. For example, ⅜th inch of travel is considered acceptable, whereas the maximum allowable travel is 1½ inch.

Since this manual operation of the brake rod requires about 30 foot pounds of unassisted mechanical force, often two people are required, one to step on the vehicle's brake pedal, and the other to measure the travel of the brake rod.

Brake adjustment, or "taking up the brake slack", in order to provide a required amount of brake rod travel, was accomplished by first making sure that the brakes were released, i.e. off. The adjusting bolt on the brake assembly's slack adjuster arm was then turned. More specifically, the spring locking sleeve was depressed, using a wrench. The adjustment bolt was then tightened until solid turning resistance resulted. This resistance condition indicated that the brake linings or pads were touching the brake drum or disk. A running clearance between the linings/pads and the drum/disk was then restored by backing off the adjusting bolt in the range of from about one-quarter to one-half turn.

The primary utility of the present invention resides in a tool for measuring the extent of travel or movement of a vehicle brake rod as the vehicle's brake mechanism is moved between its brake-off and its brake-on positions.

U.S. Pat. Nos. 4,082,165, 4,754,857, 4,796,731 and 4,798,265 describe various construction and arrangements of vehicle brakes, and these patents are incorporated herein by reference for the purpose of illustrating the background of the invention and the general state of the art.

U.S. Pat. Nos. 4,550,460, 4,572,040, 4,625,353, 4,685,164 and 4,864,900 relate to tools for manually operating the actuating mechanism of vehicle brakes. These patents are also incorporated herein by reference for the purpose of illustrating the background of the invention and the general state of the art.

U.S. Pat. No. 4,550,460 describes a two-piece air brake adjustment and measurement tool. A first part of the tool comprises a scale that is attached to the vehicle frame by means of a permanent magnet. The second part of the tool comprises an elongated handle member having an open-faced channel section fixed to one end thereof. In use, one side or the other of the open channel is located over the brake assembly's slack adjustment arm. This arm is then manually rotated, while movement of the arm is visually observed relative to the scale. In this device, distortion is present since the scale is linear, whereas the adjustment arm moves in an arcuate path.

U.S. Pat. No. 4,572,040 describes an elongated brake adjustment tool having an extending arm or pin that is used to manually ascertain the slack adjustment of a brake adjusting mechanism without the need to go beneath the vehicle.

U.S. Pat. No. 4,625,353 describes an elongated brake adjustment tool. A special spanner is removably attachable to one end of the tool by way of a socket wrench driver. This spanner includes a J-shaped hook that enables the tool to grip the brake's crank device. Manual force on the tool results in pivoting of the crank device. The user observes the resulting distance of travel of the crank device.

U.S. Pat. No. 4,685,164 discloses an air brake adjustment tool providing a channel grip member that is shaped for placement over the brake's pivotable slack adjuster. When so positioned, the handle portion of the tool enables manual pivoting of the slack adjuster, thereby enabling the stroke of the brake's piston rod to be measured.

U.S. Pat. No. 4,864,900 discloses an elongated air brake testing and adjustment tool having a forked end that fits over the brake's actuator lever. This patent provides that the brake's clevis is disconnected prior to movement of the actuating lever, this movement being for the purpose of determining if rotation of the actuating lever is excessive.

It is also known that brake adjustment/wear indicators exist in the art.

U.S. Pat. No. 4,757,300 provides an electrical device wherein a switch actuator, such as a permanent magnet, is mounted on the brake's movable air chamber shaft. A sensor is positioned to respond to this shaft moving an excessive distance as the vehicle brakes are actuated.

U.S. Pat. No. 4,776,438 provides a visual brake adjustment indicator having a bracket that is mounted on the vehicle frame so as to extend adjacent to the brake's air cylinder rod and its clevis pin. A movable pointer or digit is provided on the bracket to indicate the maximum allowable distance of travel of the clevis pin as the brakes are actuated. Within this travel distance the brakes are considered to be properly adjusted. U.S. Pat. No. 4,855,712 is also of this general type.

U.S. Pat. No. 4,279,214 provides a visual brake wear indicator wherein a sleeve member is located on the push rod of the brake actuator. Distance graduations are associated with this sleeve member, to allow visual reading of the amount of travel of the push rod. Fixed distance scales attached to the vehicle frame are shown, as are distance scales carried directly by the sleeve member.

U.S. Pat. Nos. 4,945,818, 4,989,537 and 4,991,310 are also of the above mentioned type wherein brake adjustment/wear indication is provided.

Automatic slack adjusters are also known in the art. These mechanical devices automatically adjust the clearance between the brake linings/pads and the brake drums/rotors by sensing the length of the stroke of the air chamber's push rod. More specifically, in these devices the length of the stoke is set at the time the slack adjuster is installed. When the brake linings/pads wear, the above mentioned clearance increases. If the stroke length exceeds a given limit, the slack adjuster automatically makes an adjustment during the return stroke of the push rod. It is general practice to hold a template adjacent to the brake push rod, and to then use a pry bar to move the brake rod to its brake-on position, as movement of the brake rod is observed relative to min/max marks that are carried by the template. From this data, the length of the brake rod stroke when the slack adjuster is initially installed.

The present invention also finds utility for use with such automatic slack adjusters in that the one-piece tool of this invention provides a convenient means whereby one individual can set the length of the brake rod stroke when the slack adjuster is initially installed, and/or to periodically check the length of the brake rod stroke, without the need to use a separate template or movement scale.

SUMMARY OF THE INVENTION

This invention provides a manually operable tool by which a single person may measure the brake rod travel, primarily on the air brake systems of certain automotive vehicles, trucks, buses, and the like. Brake rod travel is a measure of the distance that the brake system's air cylinder throws or moves the brake rod, to thereby cause the system's slack adjuster arm to rotate, and to thereby activate the brake shoes or pads. If brake rod travel is not within specified limits, the vehicle is considered to be "out of service". If brake rod travel is too great, the brakes are out of adjustment. If brake rod travel varies too much from wheel to wheel, the brakes are also considered to be out of adjustment. If brake rod travel that is too small, severe brake overheating will occur.

The tool of this invention provides the mechanical leverage that is required to manually activate the vehicle's brake rod, and also provides an integral measuring scale whereby the resulting movement or travel of the brake rod is accurately determined. The tool of this invention allows a single individual to determine of the amount of travel of the brake rod, for example the brake rod associated with a vehicle's air brake. In addition, the vehicle brakes can be adjusted as the tool is activated. Thus, the brakes on all vehicle wheels can be adjusted to the same brake rod stroke between their brake-off and brake-on positions.

Prior to the present invention, it was extremely difficult for a single person to make such a measurement. Usually one person used a tool to manually move the brake rod, as a second person held a ruler in place next to the brake rod to measure its movement. When a single person attempted to perform both functions it was required that this person apply force to the brake rod while concurrently attempting to hold a ruler in an observable position next to the brake rod.

The tool of the present invention provides an integral measuring scale or table that closely fits over the brake rod, generally adjacent to the vehicle's air cylinder. A shoulder of the measuring table abuts against the air cylinder, or the tool includes another structural element that mechanically engages the air cylinder at a relatively fixed position. One end of an elongated manual activating lever is pivotally attached to the measuring table. The other end of the lever comprises a hand-gripping end. A push rod, or brake rod operating member, is pivotally attached to the lever at an intermediate position, i.e. at a position that is between the lever's hand-gripping end and the lever's measuring table end. The push rod includes a mechanical structure, such as the pivoting yoke, at its free end for engaging the slack adjuster lever of the vehicle's brake assembly.

As a feature of the invention, the point of attachment of the push rod to the lever is adjustable, to thereby change the mechanical advantage that is provided by the tool.

In operation, the tool of this invention is positioned so that the measuring table end of the tool abuts the air cylinder with the tool's measuring scale being closely adjacent to and aligned with the air cylinder's brake rod. The free end of the tool's push rod is now engaged with the brake rod in a manner such that the push rod forms an angle to the lever. As force is now applied to the hand-gripping end of the lever, the brake rod is forced from its brake-off position to its brake-on position, and the extent of this brake rod movement is directly readable from the measuring scale.

The mechanical advantage obtained by the tool allows one individual to move the brake rod between the brake-off and the brake-on positions while determining the amount of travel of the brake rod in an accurate manner, and without requiring the assistance of another person. Travel of the brake rod is determined by noting the starting and ending measurements on the tool's scale relative to a portion of the brake rod. For example, a tape marker or other mark may be placed on the brake rod so as to align with the "0" mark on the tool's scale, in which case the amount of brake rod travel is directly readable. It is also possible to include an adjustable or sliding scale on the measuring table to allow alignment and direct determination of brake rod travel.

An object of this invention is to provide a one-piece manually operable tool for use with a vehicle brake assembly that is subject to wear, and thus is subject to the need for adjustment of the brake assembly. A typical brake assembly includes a brake actuating cylinder having a face wall out of which a generally straight brake rod movably extends. Operation of the air cylinder to apply vehicle brakes causes the brake rod to move linearly outward from the face wall of the actuating cylinder, as the brake rod moves from a brake-off position to an extended brake-on position. The tool of the invention includes a rigid, elongated, member having a first pivot at one end, a manual handle at the opposite end, and a second pivot at a location intermediate the two ends. A rigid L-shaped member is mounted to the first pivot, the L-shaped member having a pusher portion configured for engagement with the face wall of the brake actuating cylinder so as to be spaced from the brake rod, and also having a linear scale portion fixed to the pusher portion so as to be positioned generally adjacent and parallel to the brake rod. A rigid brake rod operating member has one end mounted to the second pivot, and includes has a portion that is spaced from its one end, this portion being configured to cooperate with the vehicle brake assembly so as to cause the brake rod to move from the brake-off position to the extended brake-on position as manual force is applied to the tool handle, to thereby cause the brake rod to move a distance relative to tool's scale portion in accordance with the need for adjustment of the vehicle brake assembly.

Another object of this invention is to provide a manually operable tool for use with a vehicle brake assembly that is subject to wear, wherein the tool includes a plurality of brake rod operating members, each one of which is configured to cooperate with a different vehicle brake assembly, and wherein the brake rod operating member is removably mounted to the second pivot, to thereby facilitate the use of a selected one of the plurality of brake rod operating members.

Other objects and advantages of the invention will be apparent from the following detailed description of the invention, which description makes reference to the drawing.

BRIEF DESCRIPTION OF THE DRAWING

FIG. 1 is a diagrammatic representation of a conventional vehicle brake assembly with which the one-piece manually operable tool of this invention finds utility;

FIG. 2 is a more detailed view of a conventional vehicle air-brake assembly with which the manually operable tool of this invention finds utility;

FIG. 4 is a side view of the tool's L-shaped member relative to the air cylinder and brake rod shown in FIG. 2;

DETAILED DESCRIPTION OF THE INVENTION

Figure 3:
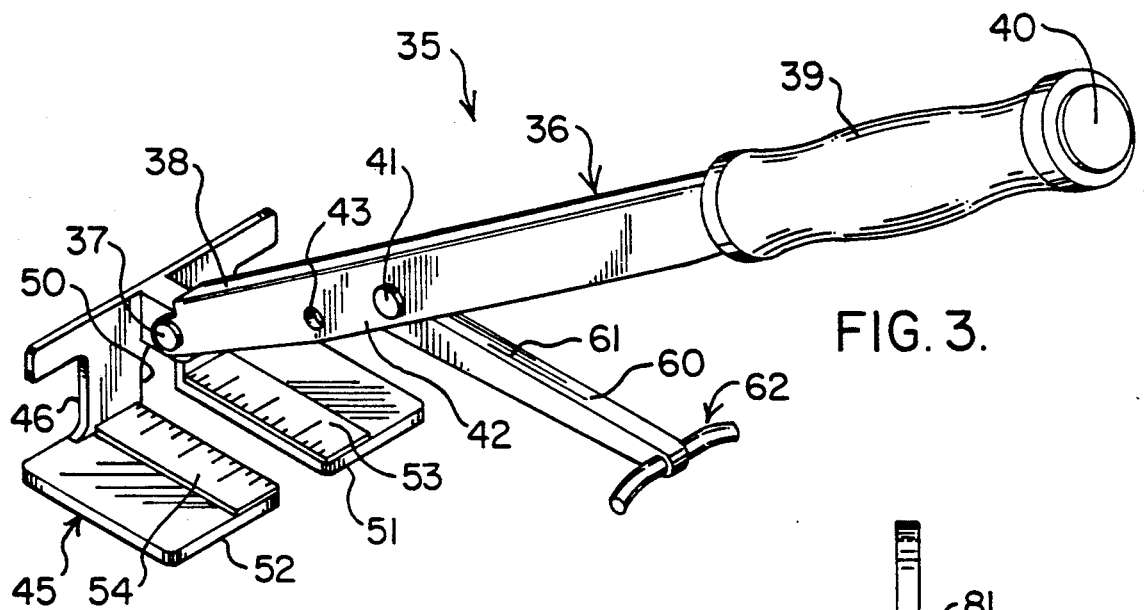
FIG. 3 is a perspective view of a first embodiment of the invention wherein the tool of this invention is constructed and arranged to physically engage the slack adjustment arm shown in FIG. 2, so as to manually cause the arm and its shaft to rotate clockwise about the center of rotation of the shaft.

FIG. 1 is a diagrammatic representation of a vehicle brake assembly 10 with which the one-piece manually operable tool of this invention finds utility.

Brake assembly 10 is a well known type that includes a brake actuating cylinder 11 having a face wall 12 out of which a generally straight and rigid metal brake rod 13 movably extends. Cylinder 11 may, for example, be an air cylinder whose operation causes brake rod 13 to move linearly outward from face wall 12 (as is shown by arrow 14) as brake rod 13 moves from a brake-off position to an extended brake-on position in response to the presence of brake actuating input 17. As a result, vehicle brakes 16 are applied, i.e. brake linings/pads are forced against the vehicle's brake drums/rotors, as is well known in the art. Later, when brake actuating input 17 is no longer present, brake rod 13 to moves linearly back toward face wall 12 (as is shown by arrow 15) as brake rod 13 moves from the extended brake-on position to a retracted brake-off position. Without limitation thereto, brake rod 13 extends generally perpendicular to face wall 12.

The exact construction and arrangement of brake assembly 10 is not to be considered a limitation on the present invention. All that is required of brake assembly 10 is that it include a brake actuating cylinder 11, or its equivalent, having a face wall 12, or its equivalent, out of which a generally straight brake rod 13 movably extends., wherein operation of the air cylinder to apply vehicle for movement between brake-off and brake-on positions.

As will be apparent, the one-piece tool of the present invention includes three parts that are coupled together to form the one-piece tool. The tool's first part is a rigid, elongated, metal member having a first pivot at one end, a manual handle at the opposite end, and a second pivot at a location intermediate its two ends.

The tool's second part is a rigid metal L-shaped member that is mounted to the first pivot, the L-shaped member having a pusher portion configured for engagement with face wall 12, so as to be spaced from brake rod 13, i.e. so as not to obstruct movement of brake rod 13.

A critical feature of the invention is that this L-shaped member include a linear scale portion that is fixed to the pusher portion in a manner to be positioned generally adjacent and parallel to brake rod 13.

The tool's third part is a rigid metal brake rod operating member has one end mounted to tool's second pivot, this operating member having a portion that is spaced from its one end, this portion of the operating brake rod operating member being configured to cooperate with brake assembly 10 so as to cause brake rod 13 to move (see arrow 14) from a brake-off position to the extended brake-on position as manual force is applied to the tool handle, to thereby cause brake rod 13 to move a distance relative to the tool's scale portion in accordance with the need for adjustment of vehicle brake assembly 10, for example, the need for adjustment of brakes 16.

While the manner in which the tool's third part operates to manually cause movement 14 of brake rod 13 from its brake-off position to its brake-on position to occur is not critical to the broad spirit and scope of the invention, the various means to be described include direct physical engagement with brake rod 13, and physical engagement with a portion of vehicle brakes 16 that are moved by brake rod 13.

All that is required is that manual force applied to the tool's handle operates to cause the tool handle to move toward brake rod 13, thereby causing brake rod movement 13 to occur, whereupon the extent of brake rod movement can be observed by viewing the tool's linear scale portion and the closely adjacent portion of brake rod 13.

FIG. 2 is a more detailed view of a vehicle air-brake assembly 20 with which the unitary manually operable tool of this invention finds utility.

Brake assembly 20 is a well known type that includes a brake actuator in the form of air cylinder 21 having a face wall 22 out of which a generally straight and rigid metal brake rod or push rod 23 moveably extends. Again, operation of air cylinder 21 causes brake rod 23 to move linearly outward from face wall 22 (i.e. movement to the right in FIG. 2) as brake rod 23 moves from a brake-off position to an extended brake-on position in response to the presence of brake actuating air input 24.

In this case, brake assembly 20 includes a metal slack adjusting arm 25 that is attached to a brake actuating shaft 26 by way of an adjustment bolt 27. Brake rod 23 is connecting to arm 25 by way of clevis pin 28.

In the device of FIG. 2 brake rod 23 causes arm 25 to move from the solid-line position to the broken line position (i.e. to rotate clockwise about the rotational axis of shaft 26) as the brakes are applied due to movement of brake rod 23 from its brakes-off position to its brakes-on position. For example, properly adjusted brakes produce a movement 29 of clevis pin 28 of about one inch.

If the vehicle brakes are out of adjustment, the initial brakes-off position of shaft 26 (and thus the brakes-off position of the brake linings/pads that are moved by rotation of shaft 26) can be manually adjusted by use of adjustment bolt 27. As is well known, this use of adjustment bolt 27 provides the desired range of movement 29 for clevis pin 28.

FIG. 3 is a perspective view of a first embodiment of the invention wherein the tool is constructed and arranged to physically engage slack adjustment arm 25 shown in FIG. 2, so as to manually cause arm 25 and shaft 26 to rotate clockwise about the center of rotation of shaft 26.

The one-piece unitary tool 35 of FIG. 3 comprises three parts that a coupled together so as to from a unitary tool assembly.

The tool's first part comprises a rigid, elongated, aluminum member 36 having a first pivot 37 at one end 38, a manual handle 39 generally at the opposite end 40, and a second pivot 41 at a location intermediate its two ends 38,40.

By way of example only, and not by way of limitation, member 36 is formed of aluminum and is about 12½ inches long. Handle portion 39 is about ⅝ inch in diameter and is covered by a foam rubber sleeve so as to provide an outer diameter handle of about 1⅛ inch. The portion of member 36 exclusive of handle portion 36 is of a rectangular cross section about ⅝ by ⅞ inch and is machined along one ⅞ inch side thereof to form a channel 42 therein. Pivot 41 is located about 2¾ inch from pivot 37.

The tool's second part comprises a rigid metal L-shaped member 45 that is mounted to first pivot 37 and is preferably formed of the same type of aluminum as is part 36.

A side view of member 45 relative to FIG. 2's face wall 22 and brake rod 23 is shown in FIG. 4. As shown in this figure, it may be desirable to place a mark such as 56 on brake rod 23 to facilitate reading movement 14 of the brake rod relative to scale portion 54.

L-shaped member 45 includes a pusher portion 46 that is configured to have a flat pusher surface 47 for engagement with the face wall 22 of air cylinder 21. A through-hole 48 is provided to receive a pin that comprises pivot 37 of FIG. 3. Pusher portion 47 includes a pair of channels 49 that are provided, for example, to decrease the likelihood of interference with protruding portions of face wall 22. Pusher portion 46 also includes a centrally located cutout 50 that accommodates the location at which brake rod 23 exits wall face 12. Thus, pusher portion 46 is spaced from brake rod 23.

The tool's second part includes a fork-shaped linear scale portion 51,52 that is fixed to, or is formed as an integral portion of, pusher portion 46 so as to be provide two scale indicia 53,54 that are adapted to be positioned closely adjacent and parallel to brake rod 23 when pusher portion is positioned in pushing relationship to wall face 12. Scale indicia 53,54 may comprise any of the well known units of distance measurement, for example inches, or may include a single indicia indicating a go/no-go range of movement 14 (see FIG. 1) for brake rod 23. Without limitation thereto, scale portion 51,52 extends generally perpendicular to pusher portion 46.

While not critical to the invention, in an embodiment thereof, metal L-shaped member 45 was about ⅛ inch thick, pusher portion 46 was about 2⅝ inch wide and about 1⅝ inch high, and fork-shaped scale portion was about 2⅝ inch wide and about 2 inches long.

The tool's third part comprises a rigid metal brake rod operating member 60 having one end 61 that extends into channel 42 so as to mount member 60 to tool member 36 by way of second pivot 41. By way of example, elongated operating member 60 is about 3¾ inch long, and is preferably formed of the same type of aluminum as is part 36.

In the embodiment of the invention shown in FIGS. 3 and 4 the free end 62 of brake rod operation member 60 is configured to cooperate with slack adjustment arm 25 shown in FIG. 2, so as to manually cause arm 25 and shaft 26 to rotate clockwise about the center of rotation of shaft 26 as force is applied to handle 39 to cause handle 39 to move toward brake rod 23, i.e. to cause brake rod 23 to move in the direction indicated by arrow 14, from the brake-off position to the extended brake-on position as manual force is applied to handle 39, to thereby cause brake rod 23 to move a distance relative to scale portion or indicia 53,54 in accordance with the need for adjustment of the vehicle brake assembly.

Without limitation thereto, the free end 62 of member 60 may include a pair of slightly curved metal posts 63,64, about 1 inch long, that form a arcuate means by which slack adjustment arm 25 is securely engaged.

Figure 8:
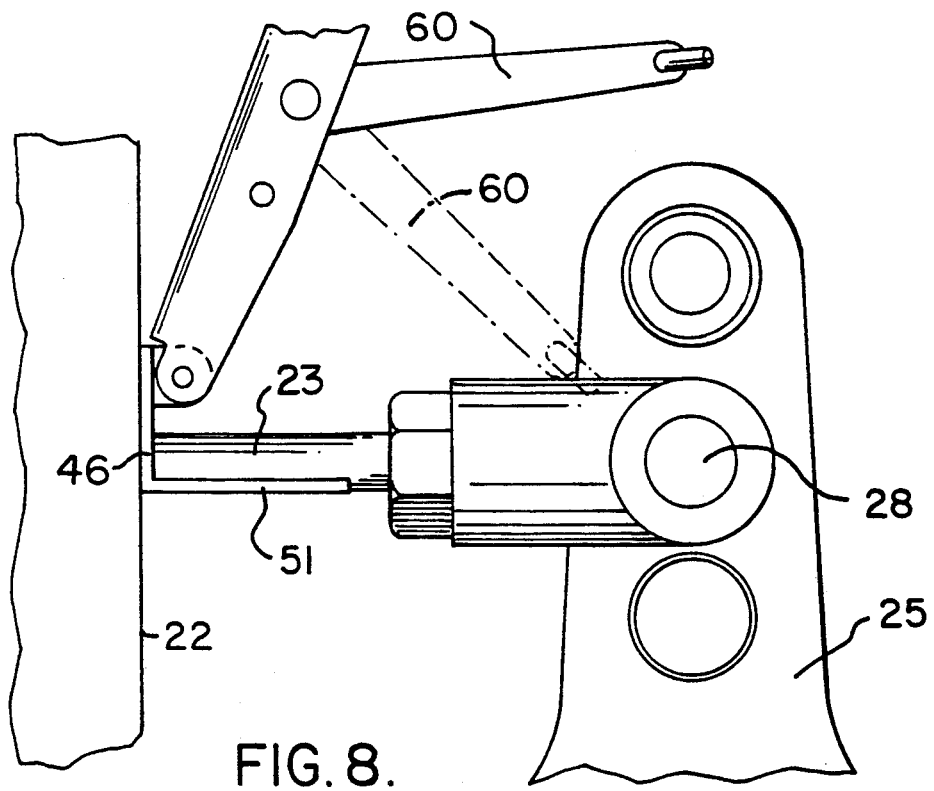
FIG. 8 is a side view of the tool of FIG. 3 as it cooperates with an exemplary air-brake assembly as shown in FIG. 2, with the tool in its non-activated position, and with the brake assembly in its brake-off position.
Figure 9:
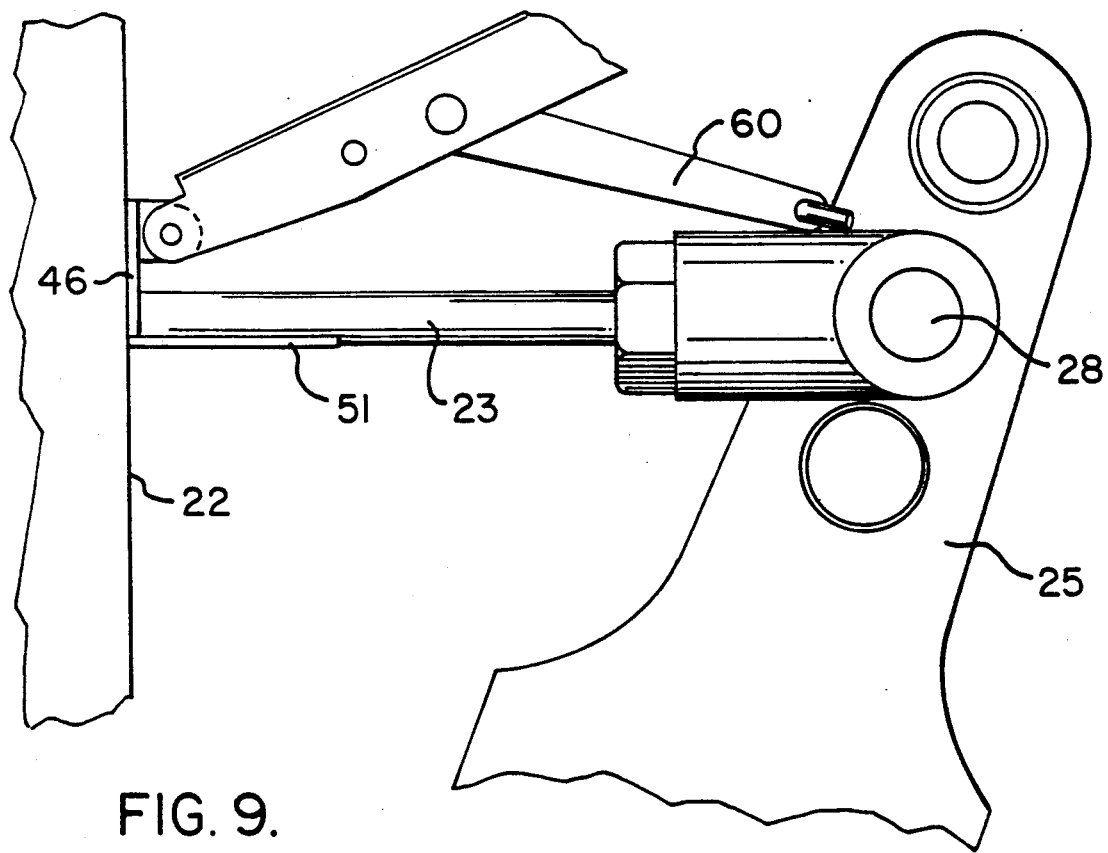
FIG. 9 is a side view, similar to FIG. 8, showing the tool in its activated position, and with the brake assembly in its brake-on position.

For purposes of illustrating the tool 35 of the invention is use, FIG. 8 provides a side view of the tool of FIG. 3 as it cooperates with the exemplary air-brake assembly shown in FIG. 2. In FIG. 8 tool 35 is in its non-activated position, and the brake assembly is in its brake-off position. FIG. 9 provides a view similar to FIG. 8 showing tool 35 in its activated position, i.e. with the tool's handle portion 39 manually pulled down toward the brake rod, such that brake rod is manually moved to its brake-on position.

As a feature of the invention, tool part 36 and its channel portion 42 is provided with an alternate second pivot location 43. In accordance with this feature of the invention, pivot 41 comprises a removable pin that facilitates placement of the end 61 of tool part 60 closer to end 38 of tool part 36, thus increasing the mechanical advantage that is provided by the tool. By way of example, second pivot location 43 is about 2 inches from the end 38 of tool part 36.

A further of the invention provides a plurality of brake rod operating members, equivalent to operating member 60 of FIG. 3, each operating member of which is configured at its free end so as to cooperate with a vehicle brake assembly in a different manner. In accordance with this feature of the invention, pivot 41 comprises a removable pin that facilitates selective use of a brake rod operating member whose free end is configured to best match the physical configuration of the vehicle brake assembly then being tested for proper adjustment.

Figure 5:
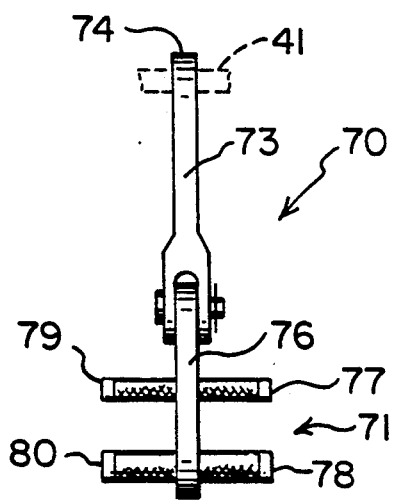
FIG. 5 is a plan view of an alternate brake rod operating member, equivalent to operating member of FIG. 3, which is configured at its free end so as to directly cooperate with the brake rod of a vehicle brake assembly.
Figure 6:
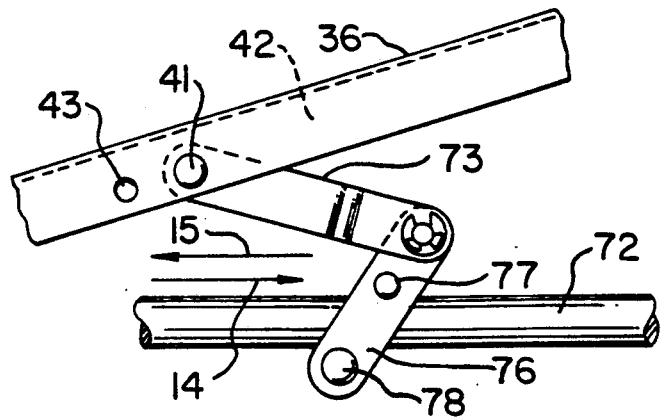
FIG. 6 is a side view of the brake rod operating member of FIG. 5 wherein its free end is shown in pushing engagement with a brake rod.

FIG. 5 is a plan view of an alternate brake rod operating member 70, equivalent to operating member 60 of FIG. 3, which is configured at its free end 71 so as to directly cooperate with the brake rod of a vehicle brake assembly. FIG. 6 is a side view of brake rod operating member 70 wherein its free end 71 is shown in a position to trap a brake rod 72, equivalent to brake rods 13 and 23 if FIGS. 1 and 2, to thereby place the tool in pushing engagement with brake rod 72.

More specifically, aluminum brake rod operating member 70 includes a first forked portion 73 whose upper end 74 contains a through-hole by which it is mounted to the tool member 36 by way of pivot 41. The lower end 75 of member 70 pivotally mounts a second metal member 76 having metal pins 77-80 extending about ⅛ inch therefrom. Pin pairs 77,78 and 79,80 are spaced about 1 inch apart. When the tool of the invention is placed in engagement with the brake assembly to be tested, brake rod 72 is trapped between a selected one of the pin pairs, in FIG. 6, pin pair 79,80, so as to cause brake rod 72 to move in direction 14 as tool handle 39 is forced toward brake rod 72. If desired, the surfaces of pin pairs 77,78 and 79,80 may be textured, as by knearling, to increase frictional engagement to brake rod 72.

Figure 7:
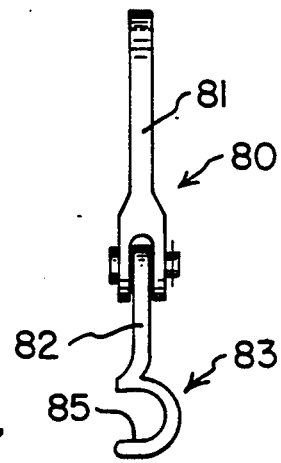
FIG. 7 is a plan view of another alternate brake rod operating member, equivalent to the operating members of FIGS. 3 and 5, which is configured at its free end so as to directly cooperate with the brake rod of a vehicle brake assembly.

FIG. 7 is a plan view of another alternate brake rod operating member 80, equivalent to the operating members of FIGS. 3 and 5, which is configured at its free end 81 so as to directly cooperate with the brake rod of a vehicle brake assembly in the manner shown in FIG. 6. More specifically, operating member 80 includes a first forked portion 81, similar to member 73 of FIG. 5, and a second metal member 82 whose free end 83 is formed in an arcuate shape so as to provide two inner, high friction surfaces 84,85 that function as pin pairs 77,78 and 79,80 function.

The mode of operation of all alternate embodiments of the invention, such as those shown in FIGS. 5-7, is identical in function to that above described relative to FIGS. 8 and 9.

Automatic slack adjustment may "ratchet" at differing intervals from one side of a vehicle to its other side. Several factors can cause this to happen such as differing material wear or the like. This can cause different rod travel measurements from wheel to wheel. If this difference is too great, the vehicle is considered out of service as it can cause pulling of the vehicle to one side when service brakes are applied.

Different brake assemblies often require varying lengths of tool configurations. Thus the downward stroke of the tool in accordance with this invention is preferably adjustable to accommodate these different brake assembly structures. The inclusion of a plurality of pivot locations such as 41 and 43 shown in FIGS. 3 and 6 provides this feature.

While this invention has been described in detail with reference to specific embodiments thereof, it is recognized that those skilled in the art will, upon reading this specification, readily visualize yet other embodiments of the invention that are within the spirit and scope of the invention. Thus, the forgoing detailed description is not be considered as a limitation on the spirit and scope of the invention.

What is claim is:

1. A unitary manually operable tool for use with a vehicle brake assembly that is subject to wear and thus to the need for adjustment thereof, the brake assembly having a brake actuating cylinder and a face wall out of which a generally straight brake rod movably extends, wherein operation of the actuating cylinder to apply vehicle brakes causes the brake rod to move linearly outward from the face wall, as the brake rod moves from a brake-off position to an extended brake-on position, the tool comprising;

a rigid, elongated, member having a first pivot at one end, a manual handle at the opposite end, and a second pivot at a location intermediate said first and second ends, a rigid L-shaped member mounted to said first pivot, said L-shaped member having a pusher portion configured for engagement with the face wall of the actuating cylinder so as to be spaced from the brake rod, and having a linear scale portion fixed to said pusher portion so as to be positioned generally adjacent and parallel to the brake rod, and a rigid brake rod operating member having one end mounted to said second pivot, said operating member having a portion spaced from said one end that is configured to cooperate with the vehicle brake assembly so as to cause the brake rod to move from the brake-off position to the extended brake-on position as manual force is applied to said handle, to thereby cause the brake rod to move a distance relative to said scale portion in accordance with the need for adjustment of the vehicle brake assembly.

2. The manually operable tool of claim 1 wherein said brake rod operating member is removably mounted to said second pivot, and wherein said rigid, elongated, member includes an alternate second pivot at a location closer to said first end than is said first-named second pivot, to thereby facilitate selective placement of said brake operating member.

3. The manually operable tool of claim 1 including a plurality of brake rod operating members each of which is configured to cooperate with a vehicle brake assembly in a different manner, and wherein said brake rod operating member is removably mounted to said second pivot, to thereby facilitate the use of a selected one of said plurality of brake rod operating members.

4. The manually operable tool of claim 1 wherein said brake rod operating member is removably mounted to said second pivot, and wherein said rigid, elongated, member includes an alternate second pivot at a location closer to said first end than is said first-named second pivot, to thereby facilitate the selective placement of said brake operating member, and including a plurality of brake rod operating members each of which is configured to cooperate with a vehicle brake assembly in a different manner, to thereby facilitate the use of a selected one of said plurality of brake rod operating members.

5. The manually operable tool of claim 1 wherein the vehicle brake assembly includes a pivoting slack adjustment arm to which the brake rod is attached to cause pivoting of the slack adjustment arm, and including a plurality of brake rod operating members, certain of which are configured to cooperate with the slack adjustment arm, and certain of which are configured to cooperate with the brake rod, and wherein said brake rod operating member is removably mounted to said second pivot, to thereby facilitate the use of a selected one of said plurality of brake rod operating members.

6. The manually operable tool of claim 5 wherein said rigid, elongated, member includes an alternate second pivot at a location closer to said first end than is said first-named second pivot, to thereby facilitate selective placement of a selected one of said plurality of brake operating members.

* * * * *